(12) United States Patent
Papadhimitri et al.

(10) Patent No.: US 10,692,235 B2
(45) Date of Patent: Jun. 23, 2020

(54) IMAGE PROCESSING APPARATUS AND METHOD FOR DETERMINING A DEPTH OF A PIXEL OF A REFERENCE IMAGE

(71) Applicant: Huawei Technologies Co., Ltd., Shenzhen (CN)

(72) Inventors: Thoma Papadhimitri, Munich (DE); Onay Urfalioglu, Munich (DE); Hector Navarro Fructuoso, Munich (DE); Jacek Konieczny, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 15/655,841

(22) Filed: Jul. 20, 2017

(65) Prior Publication Data

US 2017/0316570 A1    Nov. 2, 2017

Related U.S. Application Data

(63) Continuation of application No. PCT/EP2015/059232, filed on Apr. 28, 2015.

(51) Int. Cl.
*G06T 7/557* (2017.01)
*G06T 7/593* (2017.01)
*H04N 5/247* (2006.01)

(52) U.S. Cl.
CPC .............. *G06T 7/557* (2017.01); *G06T 7/596* (2017.01); *H04N 5/247* (2013.01);
(Continued)

(58) Field of Classification Search
CPC ........... G06T 2207/10052; G06T 7/557; G06T 7/596; G06T 2207/10028; G06T 2207/20228; G06T 2200/21; H04N 5/247
See application file for complete search history.

(56) References Cited

U.S. PATENT DOCUMENTS 7,898,569 B2    3/2011 Koselka et al.
8,619,082 B1 *  12/2013 Ciurea .................... G06T 15/20
                                                          345/427
(Continued)

FOREIGN PATENT DOCUMENTS

CN    101511017 A    8/2009
CN    103021013 A    4/2013
(Continued)

OTHER PUBLICATIONS

Choudhury et al., "Multi-epipolar plane image based 3D reconstruction using robust surface fitting," ICVGIP '14, XP055239944, ACM (2014).

(Continued)

*Primary Examiner* — Pinalben Patel
(74) *Attorney, Agent, or Firm* — Leydig, Voit & Mayer, Ltd.

(57) ABSTRACT

The disclosure relates to an image processing apparatus for determining a depth of a pixel of a reference image of a plurality of images representing a visual scene relative to a plurality of locations, wherein the plurality of locations define a two-dimensional grid with rows and columns and wherein the location of the reference image is associated with a reference row and a reference column of the grid. The image processing apparatus comprises a depth determiner configured to determine a first depth estimate on the basis of the reference image and a first subset of the plurality of images for determining the depth of the pixel of the reference image, wherein the images of the first subset are associated with locations being associated with a row of the grid different than the reference row and with a column of the grid different than the reference column.

17 Claims, 9 Drawing Sheets

(52) U.S. Cl.
CPC ............... *G06T 2200/21* (2013.01); *G06T 2207/10028* (2013.01); *G06T 2207/10052* (2013.01); *G06T 2207/20228* (2013.01)

(56) References Cited

U.S. PATENT DOCUMENTS

2011/0026764 A1* 2/2011 Wang ............... G06K 9/00201 382/103
2015/0042767 A1* 2/2015 Ciurea ............... H04N 13/232 348/48

FOREIGN PATENT DOCUMENTS

DE 102012105435 A1 12/2013
WO 2015028040 A1 3/2015

OTHER PUBLICATIONS

Nalpantidis et al., "Obtaining Reliable Depth Maps for Robotic Applications from a Quad-Camera System," ICIRA 2009, pp. 906-916, XP019135966, Springer-Verlag Berlin Heidelberg, (2009).
Wanner et al., "Globally Consistent Depth Labeling of 4D Light Fields," 2012 IEEE Conference on Computer Vision and Pattern Recognition (CVPR), pp. 41-48, Institute of Electrical and Electronics Engineers, New York, New York (2012).
Kim et al., "Scene Reconstruction from High Spatio-Angular Resolution Light Fields," ACM Transactions on Graphics vol. 32, No. 4, Article 73, ACM (Jul. 2013).
Wanner et al., "Orientation Analysis in 4D Light Fields," PhD Thesis, Heidelberg Collaboratory for Image Processing (HCI), University of Heidelberg, (2014).
Diebold et al., "Epipolar Plane Image Refocusing for Improved Depth Estimation and Occlusion Handling," Vision, Modeling, and Visualization, Heidelberg Collaboratory for Image Processing, The Eurographics Association (2013).

\* cited by examiner

IMAGE PROCESSING APPARATUS AND METHOD FOR DETERMINING A DEPTH OF A PIXEL OF A REFERENCE IMAGE

CROSS-REFERENCE TO RELATED APPLICATIONS

This application is a continuation of International Application No. PCT/EP2015/059232, filed on Apr. 28, 2015, the disclosure of which is hereby incorporated by reference in its entirety.

TECHNICAL FIELD

The present disclosure relates to an image processing apparatus and method. In particular, the present disclosure relates to an image processing apparatus and method for determining the depth of a pixel of a reference image of a plurality of images representing a visual scene relative to a plurality of locations.

BACKGROUND

A fundamental task in the field of computer vision and computational photography is the estimation of a depth map of a real world visual scene on the basis of a 4D light field thereof, i.e. a plurality of 2D images of the real world visual scene captured on a regular grid of camera positions. As plenoptic cameras are becoming more and more popular and are expected to replace conventional digital cameras in the near future, the need for computationally efficient depth map estimation algorithms will increase even further in the future.

However, the task of estimating a depth map from a 4D light field, i.e. a plurality of 2D images of the real world visual scene captured on a regular grid of camera positions, still faces various challenges, such as the accurate depth map estimation of the visual scene at textureless, i.e. uniform color, areas and/or at depth discontinuities. Indeed, at uniform color areas, identifying corresponding points of the visual scene across multiple views/images is extremely difficult. Current algorithmic solutions tend to over smooth the estimated depth map. Unfortunately, this is the case at objects' boundaries as well as where depth discontinuities are stronger. This results in an inaccurate depth map estimation of the visual scene at those locations.

The article "Globally Consistent Depth Labeling of 4D Light Fields", S. Wanner and B. Goldluecke, Computer Vision and Pattern Recognition (CVPR), 2012 describes a method for estimating the depth map of a visual scene via an orientation analysis (based on the so-called structure tensor) of the epipolar images. Each of these images is a 2D cut of the 4D light field. The structure tensor analysis provides an initial depth map estimation, i.e. a fast local solution, which then can be further improved by applying a global optimization approach, i.e. a slow global solution. This comes with the cost of added computational complexity. The fast local solution can be implemented in real time on standard graphics processing units (GPUs). For estimating the depth map of the visual scene a first depth map is obtained from images whose centers are positioned regularly along the horizontal line passing from the center of the reference image and a second depth map is obtained from the images positioned along the vertical direction. The first and the second depth maps are merged to obtain a final depth map, wherein the merging of the first and second depth maps is based on their confidence maps in that for each pixel the depth value with the highest confidence value among the two candidates is chosen.

The article "Scene Reconstruction from High Spatio-Angular Resolution Light Fields', SIGGRAPH, 2013 describes an alternative solution for a visual scene reconstruction from 4D light fields which can deal better with uniform color areas while still preserving depth map discontinuities. Also in this case the computational complexity is high and for this reason a real time implementation is not possible. The input 4D light field must also be sampled densely enough, which in the case of plenoptic cameras is generally not possible. Also in this case a first depth map is obtained from images whose centers are positioned regularly along the horizontal line passing from the center of the reference image and a second depth map is obtained from the images positioned along the vertical direction.

Thus, there is a need for an improved image processing apparatus and method, in particular an image processing apparatus and method allowing for an improved depth estimation.

SUMMARY

It is an objective of the disclosure to provide an image processing apparatus and method allowing for an improved depth estimation.

In order to describe the disclosure in detail, the following terms will be used having the following meaning:

2D image A two dimensional picture of a real world visual scene acquired, for instance, by a digital camera.

4D light field A series of 2D images of a real world visual scene captured on a regular grid (e.g. rectangular or hexagonal) of camera positions.

Plenoptic camera A camera that captures a 4D light field.

Depth map Usually a grayscale 2D image of a visual scene where bright pixels indicate points of the scene closer to the camera and darker pixels indicate points further away.

Reference image One of the images of the 4D light field for which the depth map it to be calculated.

Confidence map Usually a grayscale 2D image (generally having values between 0 and 1) where bright pixels indicate points of the visual scene whose depth estimation is more reliable and darker pixels indicate pixels corresponding to points of the visual scene whose depth estimation is less reliable.

Baseline Distance between the centers of 2 consecutive image, i.e. camera, locations.

Disparity Displacement between the projection of a certain point/pixel of a visual scene in one image and the projection of the corresponding point/pixel in a consecutive neighboring image. The disparity is inversely proportional to the distance of that point/pixel from the camera, i.e. the depth of the point/pixel.

According to a first aspect, the disclosure relates to an image processing apparatus for determining a depth of a pixel of a reference image of a plurality of images representing a visual scene relative to a plurality of locations, wherein the plurality of locations define a two-dimensional regular grid with rows and columns, for instance, a rectangular grid, and wherein the location of the reference image is associated with a reference row and a reference column of the grid.

The image processing apparatus comprises a depth determiner configured to determine a first depth estimate on the basis of the reference image and a first subset of the plurality of images for determining the depth of the pixel of the reference image, wherein the images of the first subset are associated with locations being associated with at least one row of the grid different than the reference row and with at least one column of the grid different than the reference column. Thus, an image processing apparatus is provided allowing for an improved depth estimation.

In a first possible implementation form of the first aspect of the disclosure, the depth determiner is further configured to determine a second depth estimate on the basis of the reference image and a second subset of the plurality of images, wherein the images of the second subset of the plurality of images are associated with locations being associated with the reference row, and wherein the depth determiner is further configured to combine the first depth estimate and the second depth estimate for determining the depth of the pixel of the reference image. This implementation form combines in a computationally efficient manner the depth information available from the images lying in the same row as the reference image and images lying in different rows and columns.

In a second possible implementation form of the first aspect of the disclosure as such or the first implementation form thereof, the depth determiner is further configured to determine a third depth estimate on the basis of the reference image and a third subset of the plurality of images, wherein the images of the third subset of the plurality of images are associated with locations being associated with the reference column, and configured to combine the first depth estimate, the second depth estimate and/or the third depth estimate for determining the depth of the pixel of the reference image. This implementation form combines in a computationally efficient manner the depth information available from the images lying in the same column as the reference image and images lying in different rows and columns.

In a third possible implementation form of the second implementation form of the first aspect of the disclosure, the depth determiner is configured to determine the depth of the pixel of the reference image by computing a median value of the first depth estimate, the second depth estimate and/or the third depth estimate. This implementation form provides a computationally efficient way of determining the depth without having to compute confidence values.

In a fourth possible implementation form of the first aspect of the disclosure as such or any one of the first to third implementation forms thereof, the depth determiner is configured to determine the first depth estimate, the second depth estimate and/or the third depth estimate by determining the slope of the epipolar line defined by the position of the pixel in the reference image and the positions of the corresponding pixels in the first subset, the second subset or the third subset of the plurality of images, respectively. This implementation form yields exceptionally good depth estimates.

In a fifth possible implementation form of the first aspect of the disclosure as such or any one of the first to fourth implementation forms thereof, the image processing apparatus further comprises a confidence value determiner, wherein the confidence value determiner is configured to determine a respective confidence value associated with the first depth estimate, the second depth estimate and/or the third depth estimate. This implementation form yields very reliable depth estimates.

In a sixth possible implementation form of the fifth implementation form of the first aspect of the disclosure, the depth determiner is configured to determine the depth of the pixel of the reference image by choosing as the depth of the pixel of the reference image the depth estimate from the group consisting of the first depth estimate, the second depth estimate and/or the third depth estimate having the largest confidence value. This implementation form yields very reliable depth estimates.

In a seventh possible implementation form of the fifth or sixth implementation form of the first aspect of the disclosure, the confidence value determiner is configured to determine the confidence value for the first depth estimate, the second depth estimate and/or the third depth estimate on the basis of a structure tensor defined by the first subset, the second subset and the third subset of the plurality of images, respectively. This implementation form yields very reliable depth estimates.

In an eighth possible implementation form of the seventh implementation form of the first aspect of the disclosure, the confidence value determiner is configured to exclude a depth estimate on the basis of a filter K defined by the equation:

$$K(d) = \frac{e^{-d^2}}{\sqrt{2\pi} \, b},$$

where d denotes the disparity of the pixel and b denotes the baseline defined by the reference image and the first subset of the plurality of images. This implementation form uses only reliable depth estimates for estimating the depth.

In a ninth possible implementation form of the first aspect of the disclosure as such or any one of the first to eighth implementation forms thereof, the depth determiner is configured to determine the depth of the pixel of the reference image on the basis of the first depth estimate by interpolating the intensity of the pixel between the intensity of the pixel in the reference image and the intensities of the corresponding pixels in the first subset of the plurality of images. This implementation form allows for a dense disparity processing.

In a tenth possible implementation form of the first aspect of the disclosure as such or any one of the first to ninth implementation forms thereof, the image processing apparatus further comprises an image recorder configured to record the plurality of images representing the visual scene at the plurality of locations.

In an eleventh possible implementation form of the tenth implementation form of the first aspect of the disclosure, the image recorder comprises a movable camera, an array of cameras or a plenoptic camera.

In a twelfth possible implementation form of the first aspect of the disclosure as such or any one of the first to eleventh implementation forms thereof, the image processing apparatus is configured to determine a depth map for the reference image by determining a depth estimate for a plurality of pixels of the reference image.

In a thirteenth possible implementation form of the first aspect of the disclosure as such or any one of the first to twelfth implementation forms thereof, the depth determiner is configured to determine the first depth estimate on the basis of the reference image and the first subset of the plurality of images for determining the depth of the pixel of the reference image, wherein the reference image and the first subset of the plurality of images share a common center pixel.

According to a second aspect the disclosure relates to an image processing method for determining a depth of a pixel of a reference image of a plurality of images representing a visual scene relative to a plurality of locations, the plurality of locations defining a two-dimensional grid with rows and columns, the location of the reference image being associated with a reference row and a reference column of the grid. The image processing method comprises the step of determining a first depth estimate on the basis of the reference image and a first subset of the plurality of images for determining the depth of the pixel of the reference image, wherein the images of the first subset are associated with locations being associated with at least one row of the grid different than the reference row and with at least one column of the grid different than the reference column.

The image processing method according to the second aspect of the disclosure can be performed by the image processing apparatus according to the first aspect of the disclosure. Further features of the image processing method according to the second aspect of the disclosure result directly from the functionality of the image processing apparatus according to the first aspect of the disclosure and its different implementation forms.

According to a third aspect the disclosure relates to a computer program comprising program code for performing the method according to the second aspect of the disclosure when executed on a computer.

The disclosure can be implemented in hardware and/or software.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense.

It is understood that a disclosure in connection with a described method may also hold true for a corresponding device or system configured to perform the method and vice versa. For example, if a specific method step is described, a corresponding device or apparatus may include a unit to perform the described method step, even if such unit is not explicitly described or illustrated in the figures. Further, it is understood that the features of the various exemplary aspects described herein may be combined with each other, unless specifically noted otherwise.

Figure 1:
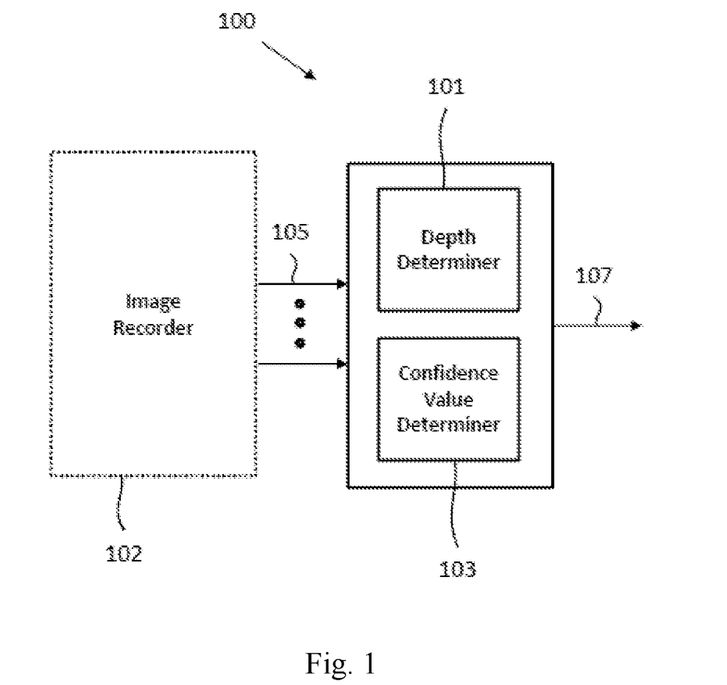
FIG. 1 shows a schematic diagram of an image processing apparatus according to an embodiment.
Figure 2:
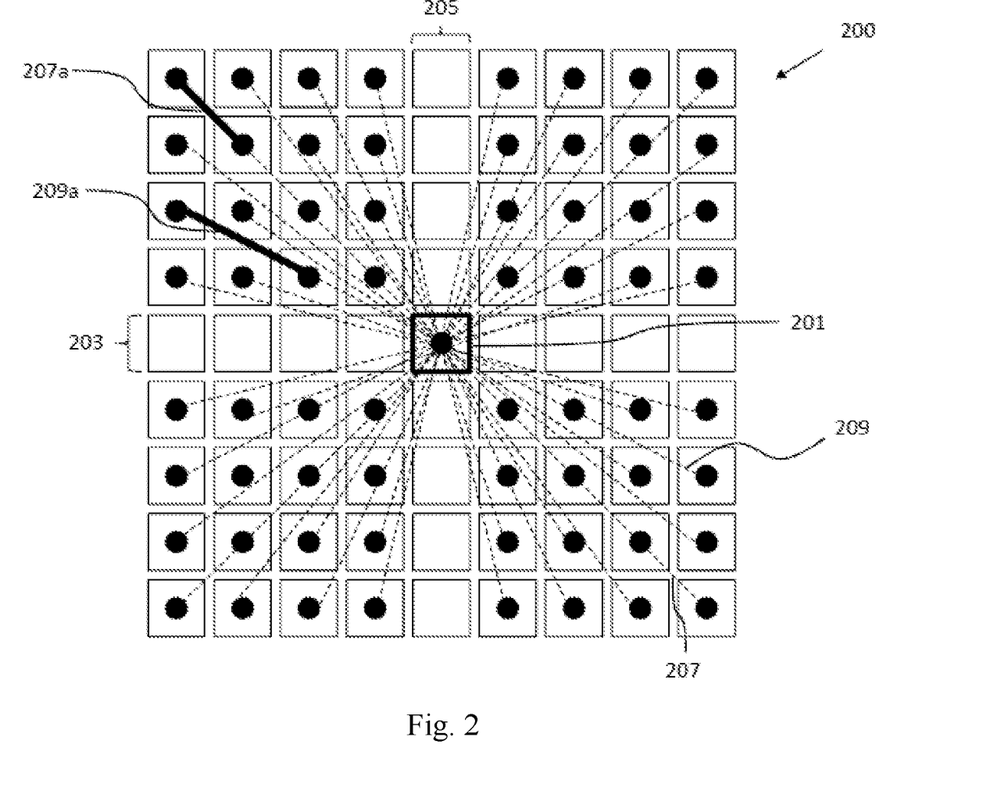
FIG. 2 shows an illustrative example of a grid of a plurality of images that can be processed by an image processing apparatus and method according to an embodiment.
Figure 3:
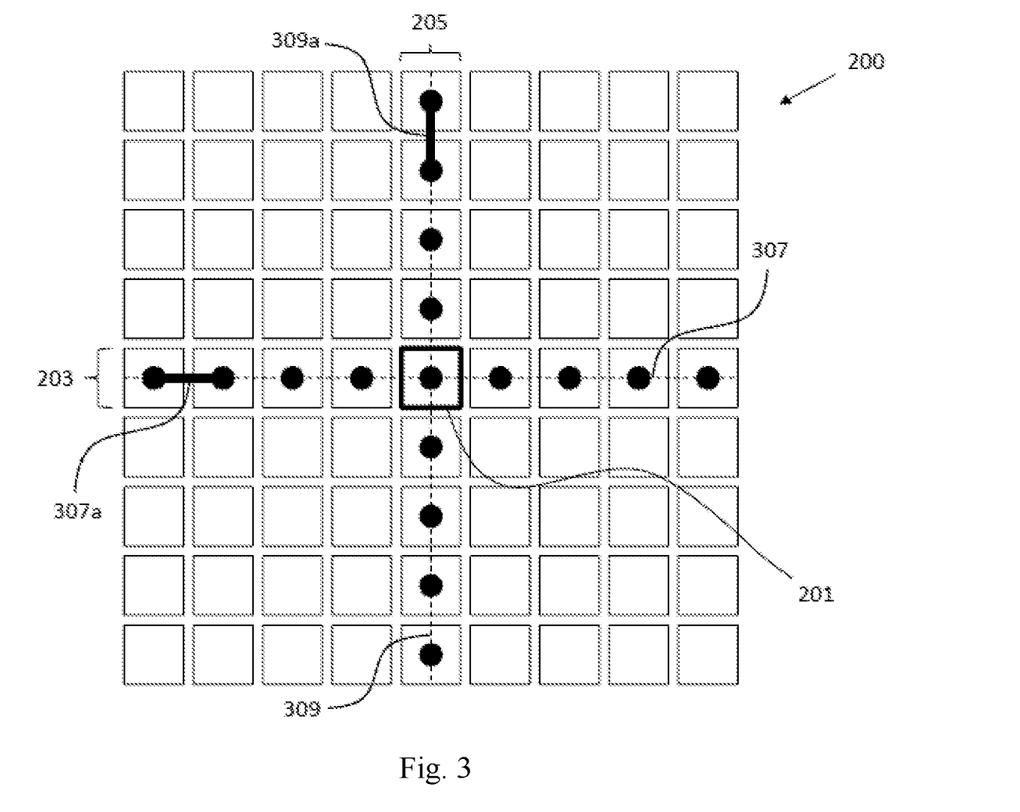
FIG. 3 shows an illustrative example of a grid of a plurality of images that can be processed by an image processing apparatus and method according to an embodiment.

FIG. 1 shows a schematic diagram of an image processing apparatus 100 according to an embodiment. The image processing apparatus 100 is configured to determine a depth 107 of a pixel of a reference image of a plurality of images representing a visual scene relative to a plurality of locations representing, for instance, camera positions. The plurality of locations define a regular two-dimensional grid with rows and columns. FIGS. 2 and 3 show an exemplary square-shaped two-dimensional grid 200 of camera positions. In the exemplary square-shaped two-dimensional grid 200 of FIGS. 2 and 3 the central image has been chosen as the reference image 201 for illustration purposes. As the person skilled in the art will appreciate, according to the present disclosure any one image of the plurality of images shown in FIGS. 2 and 3 could be chosen as reference image as well. The reference image 201 is located within a reference row 203 and a reference column 205 of the two-dimensional grid 200.

The image processing apparatus 100 comprises a depth determiner 101 configured to determine a first depth estimate on the basis of the reference image 201 and a first subset of the plurality of images 105 for determining the depth 107 of the pixel of the reference image 201, wherein the images of the first subset are associated with locations being associated with at least one row of the grid 200 different than the reference row 203 and with at least one column of the grid 200 different than the reference column 205.

In an embodiment, the image processing apparatus 100 can comprise an image recorder 102 configured to record the plurality of images 105 representing the visual scene at the plurality of locations. In an embodiment, the image recorder 102 comprises, for instance, a movable camera, an array of cameras or a plenoptic camera. In an embodiment, the image processing apparatus 100 is configured to determine a depth map for the reference image 201 by determining a respective depth 107 for a plurality of pixels of the reference image 201.

In an embodiment, the depth determiner 101 is configured, for instance, to determine a first depth estimate on the basis of the reference image 201 and the subset of the plurality of images 105 of the grid 200 lying along the dashed line 207 shown in FIG. 2, corresponding to one diagonal of the grid 200.

In an embodiment, the depth determiner 101 is configured, for instance, to determine a first depth estimate on the basis of the reference image 201 and the subset of the plurality of images 105 of the grid 200 lying along the dashed line 209 shown in FIG. 2 making an angle of less than 45° with a line defined by the reference row 203 of the grid 200.

In an embodiment, the depth determiner 101 is further configured to determine a second depth estimate on the basis of the reference image 201 and a second subset of the plurality of images 105, wherein the images of the second subset of the plurality of images 105 are associated with locations being associated with the reference row 203, and wherein the depth determiner 101 is further configured to combine the first depth estimate and the second depth estimate for determining the depth 107 of the pixel of the reference image. In an embodiment, the depth determiner 101 is further configured, for instance, to determine the second depth estimate on the basis of the reference image 201 and the second subset of the plurality of images 105 lying along the dashed line 307 shown in FIG. 3.

In an embodiment, the depth determiner 101 is further configured to determine a third depth estimate on the basis of the reference image 201 and a third subset of the plurality of images 105, wherein the images of the third subset of the plurality of images 105 are associated with locations being associated with the reference column 205, and wherein the depth determiner 101 is further configured to combine the first depth estimate, the second depth estimate and/or the third depth estimate for determining the depth 107 of the pixel of the reference image 201. In an embodiment, the depth determiner 101 is further configured, for instance, to determine the third depth estimate on the basis of the reference image 201 and the third subset of the plurality of images 105 lying along the dashed line 307 shown in FIG. 3.

In an embodiment, the depth determiner 101 is configured to determine the depth 107 of the pixel of the reference image 201 by computing a median value of the first depth estimate, the second depth estimate and/or the third depth estimate. In an embodiment, the depth determiner 101 is configured, for instance, to determine the depth 107 of the pixel of the reference image 201 by computing a median value of the first depth estimate determined on the basis of the reference image 201 and the subset of the plurality of images 105 of the grid 200 lying along the dashed line 207 shown in FIG. 2, the second depth estimate determined on the basis of the reference image 201 and the second subset of the plurality of images 105 lying along the dashed line 309 shown in FIG. 3 and the third depth estimate determined on the basis of the reference image 201 and the third subset of the plurality of images 105 lying along the dashed line 307 shown in FIG. 3.

In an embodiment, the depth determiner 101 is configured to determine the first depth estimate on the basis of the reference image 201 and the first subset of the plurality of images 105 for determining the depth 107 of the pixel of the reference image 201, wherein the reference image 201 and the first subset of the plurality of images 105 share a common center pixel.

As a person skilled in the art will appreciate, the baseline 207a for the images lying along the dashed line 207 shown in FIG. 2 and the baseline 209a for the images lying along the dashed line 209 shown in FIG. 2 differ from the baseline 307a for the images lying along the dashed line 307 shown in FIG. 3 and the baseline 309a for the images lying along the dashed line 309 shown in FIG. 3.

Figure 4:
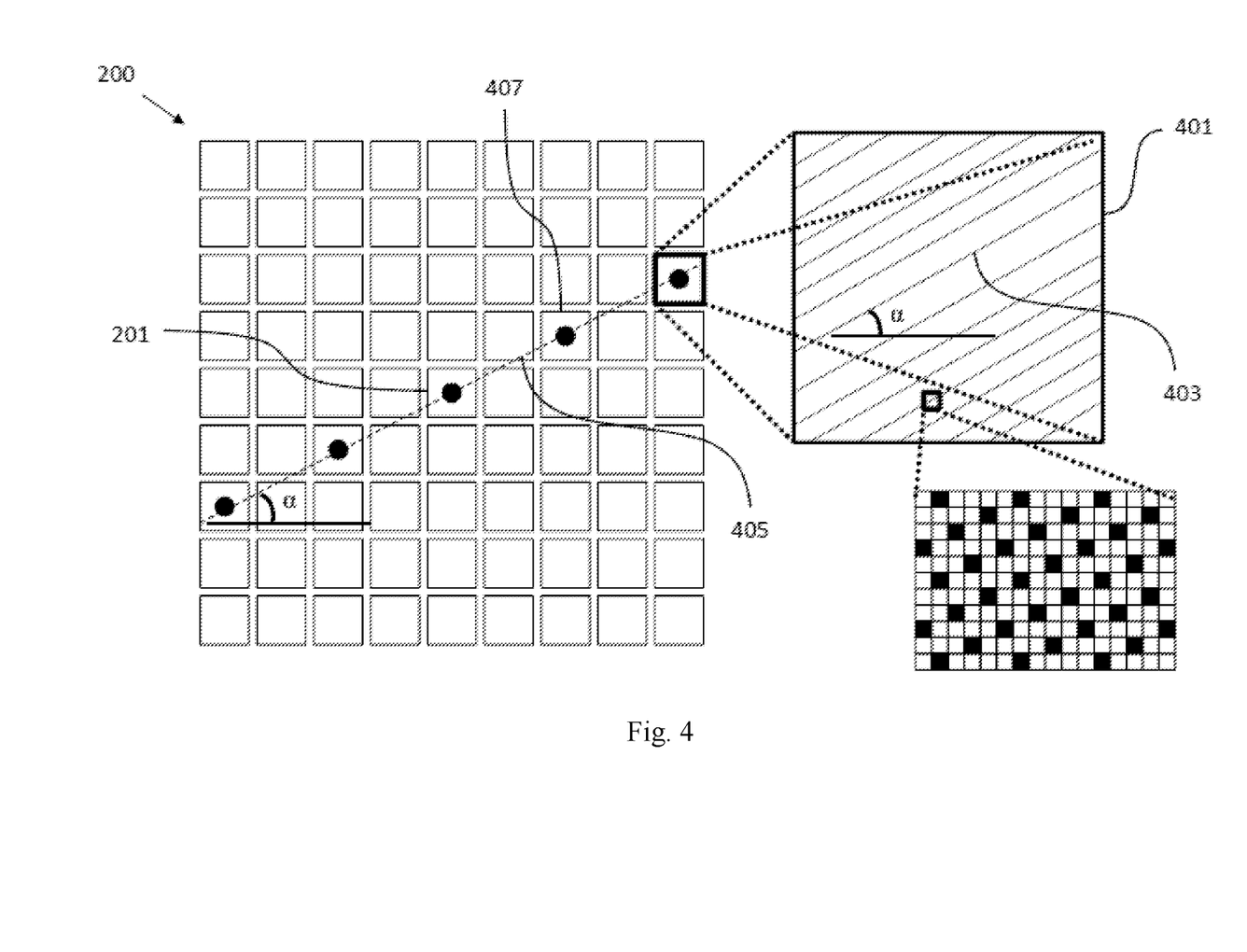
FIG. 4 shows a schematic diagram illustrating pixel selection in a grid of a plurality of images implemented in an image processing apparatus according to an embodiment.

For the images lying along the dashed line 207 shown in FIG. 2 or the images lying along the dashed line 209 shown in FIG. 2 the pixels that are processed lie on lines within a given image whose direction forms the same angle, for instance, with the lower edge of the image as the dashed line 207 or the dashed line 209 forms, for instance, with the horizontal line 307 shown in FIG. 3. This is illustrated in more detail in FIG. 4. The dashed line 405 shown in FIG. 4 defines an exemplary subset of the plurality of images 105 of the grid 200 that can be processed by the image processing apparatus 100 together with the reference image to determine the depth of a pixel within the reference image 201. The dashed line 405 shown in FIG. 4 makes an angle α with, for instance, the horizontal line 307 shown in FIG. 3. As can be taken from the more detailed views on the right hand side of FIG. 4, in the image 401, for instance, the pixels potentially corresponding to the pixel of the reference image 201 whose depth is to be determined lie along lines, such as the line 403, making the same angle α with, for instance, the lower edge of the image 401. As the person skilled in the art will appreciate, this will lead to a sparser sampling of potentially corresponding pixels along the line 405 compared to a sampling along the lines 307 or 309 described above in the context of FIG. 3. For this reason, in an embodiment, the depth determiner 101 is configured to interpolate the intensity of the pixel whose depth is to be determined between the intensity of the pixel in the reference image 201 and the intensities of the corresponding pixels in the subset of the plurality of images 105 being processed and to determine the depth of the pixel on the basis of this interpolation. In an embodiment, the depth determiner 101 is further configured, for instance, to interpolate the intensity of the pixel whose depth is to be determined between the intensity of the pixel in the reference image 201 and the intensity of the corresponding pixel in the image 407 shown in FIG. 4. In an embodiment, the depth determiner 101 can be configured to perform a bilinear interpolation.

In an embodiment, the depth determiner 101 is configured to determine the first depth estimate, the second depth estimate and/or the third depth estimate by determining the slope of the epipolar line defined by the position of the pixel in the reference image and the positions of the corresponding pixels in the first subset, the second subset or the third subset of the plurality of images, respectively. This embodiment of determining the depth estimate using the slope of the epipolar line will be described in more detail further below under further reference to FIGS. 5 and 6.

Figure 5:
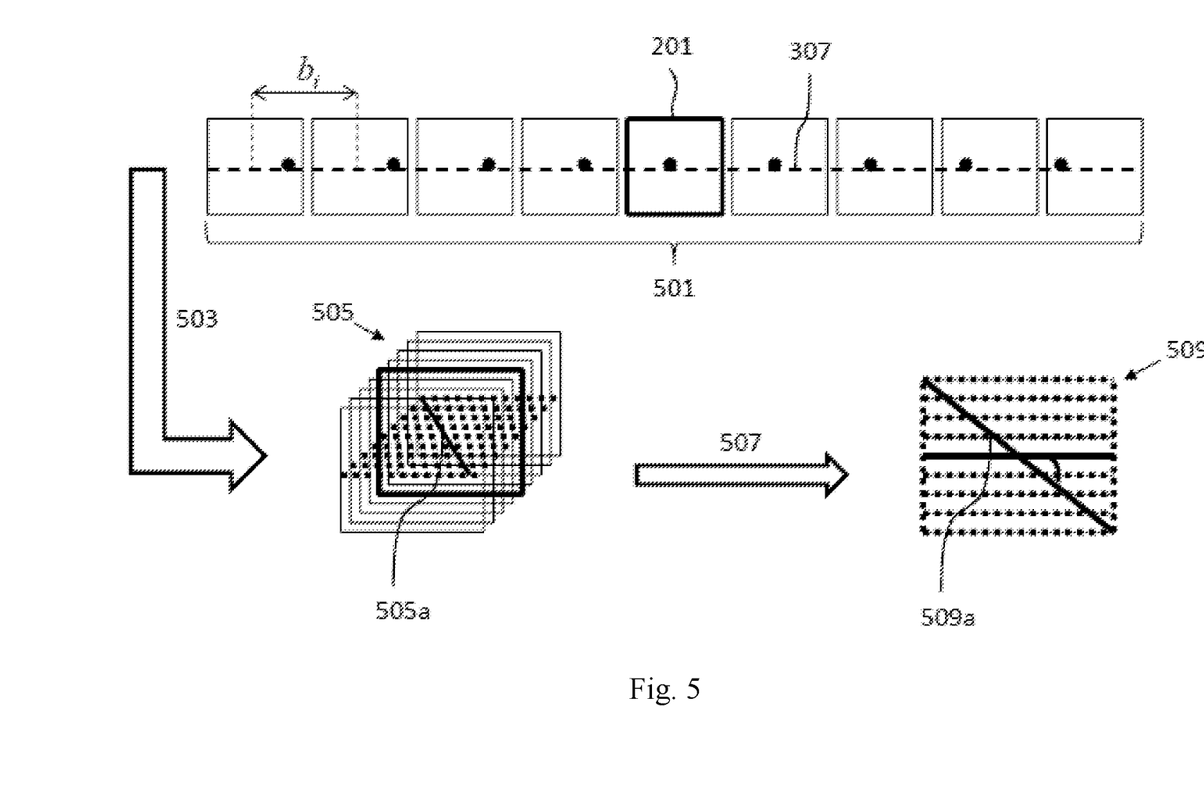
FIG. 5 shows a schematic diagram illustrating depth estimation implemented in an image processing apparatus according to an embodiment.

FIG. 5 illustrates determining the depth estimate using the slope of the epipolar line for the exemplary line 307 shown in FIG. 3. The subset 501 of the plurality of images 105 lying along the line 307 shown in FIG. 3 (which is equivalent to the subset of the plurality of images 105 belonging to the reference row 203) is stacked in a step 503 as a 3D image cube 505. The pixel in the reference image 201 whose depth is to be determined and the corresponding pixels in the other images of the subset 501 of the plurality of images 105 define a line 505a along a horizontal plane within the 3D image cube 505. In a step 507 this horizontal plane is extracted by slicing the 3D image cube 505 resulting in an epipolar image 509. Within the epipolar image 509 the line 505a defines an epipolar line 509a that forms a certain angle with the horizontal direction of the image, which, in turn, can be used to provide a depth estimate.

Figure 6:
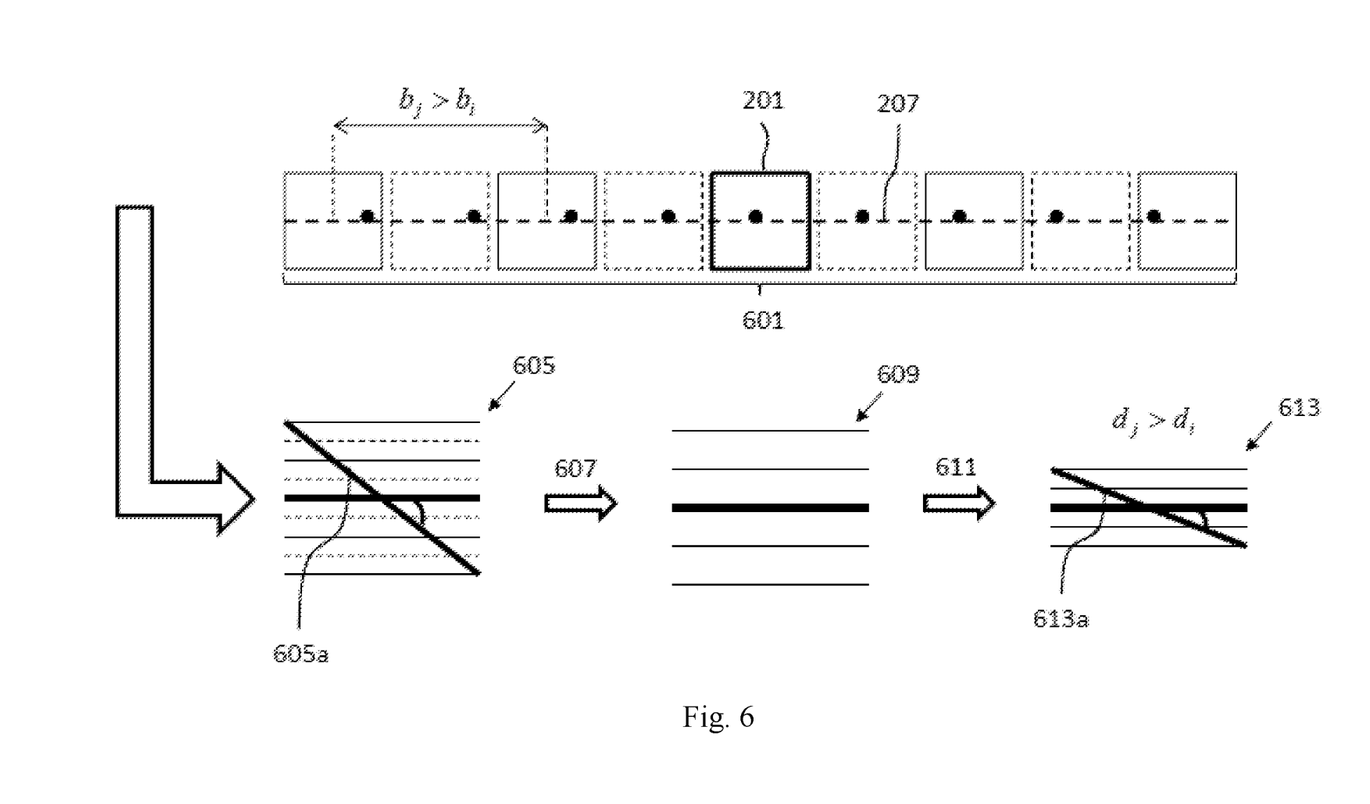
FIG. 6 shows a schematic diagram illustrating depth determination implemented in an image processing apparatus according to an embodiment.

FIG. 6 illustrates determining the depth estimate using the slope of the epipolar line for the exemplary line 207 shown in FIG. 2. As the person skilled in the art will appreciate, in this case the baseline $b_j$ is larger than the baseline $b_i$ for the example shown in FIG. 6. The pixel in the reference image 201 whose depth is to be determined and the corresponding pixels in the other images of the subset 601 of the plurality of images 105 define a line 605a along a horizontal plane 605. In a step 607 those images of the subset 601 that are not to be processed are removed from the horizontal plane resulting in a modified horizontal plane 609. In a step 611 the modified horizontal plane is refocused resulting in a refocused modified horizontal plane 613 for determining the angle defined by the epipolar line 613a, which, in turn, can be used to provide a disparity and depth estimate.

In an embodiment, the image processing apparatus 100 further comprises a confidence value determiner 103, wherein the confidence value determiner 103 is configured to determine a respective confidence value associated with the first depth estimate, the second depth estimate and/or the third depth estimate. In an embodiment, the depth determiner 101 is configured to determine the depth 107 of the pixel of the reference image 201 by choosing as the depth 107 of the pixel of the reference image 201 the depth estimate from the group consisting of the first depth estimate, the second depth estimate and/or the third depth estimate having the largest confidence value.

In an embodiment, the confidence value determiner 103 is configured to determine the confidence value for the first depth estimate, the second depth estimate and/or the third depth estimate on the basis of a structure tensor defined by the first subset, the second subset and the third subset of the plurality of images 105, respectively. The structure tensor is based on the calculation of the image derivatives. In an embodiment, the structure tensor can be used for determining the depth estimate by determining the slope of the epipolar line defined by the position of a pixel in the reference image and the positions of the corresponding pixels in the subsets of the plurality of images as well. Using the structure tensor for determining a depth estimate and/or a confidence value in a way that can be implemented in the present disclosure is described in great detail, for instance, in the article "Globally Consistent Depth Labeling of 4D Light Fields", S. Wanner and B. Goldluecke, Computer Vision and Pattern Recognition (CVPR), 2012 or in the PhD thesis "Orientation Analysis in 4D Light Fields", Sven Wanner, Heidelberg Collaboratory for Image Processing (HCI), University of Heidelberg, 2014, which are herein fully incorporated by reference.

Figure 7:
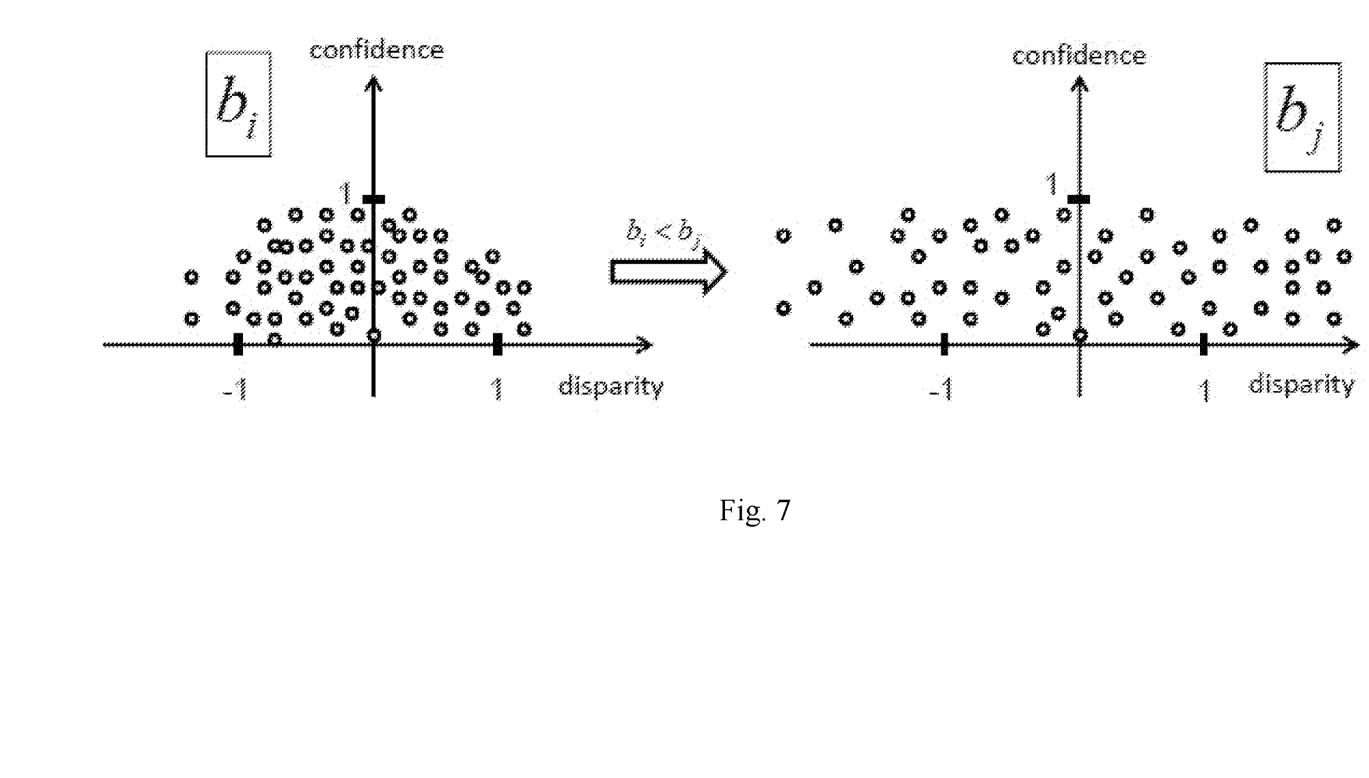
FIG. 7 shows a schematic diagram illustrating confidence value determination implemented in an image processing apparatus according to an embodiment.

In FIG. 7 every dot in the two plots shows the estimated confidence (y-axis) and estimated disparity (x-axis) of a certain 3D point/pixel in the visual scene. Both plots show the dots relative to the same points of the 3D scene. However, the left plot in FIG. 7 shows the case of smaller baselines. If the baselines are larger, then the estimated disparities will be larger in average.

In an embodiment, the confidence value determiner 103 is configured to exclude depth estimates of less reliable pixels on the basis of a filter K defined by the equation:

$$K(d) = \frac{e^{-d^2}}{\sqrt{2\pi} \, b},$$

where d denotes the disparity of the pixel and b denotes the baseline defined by the reference image and the first subset of the plurality of images.

Figure 8:
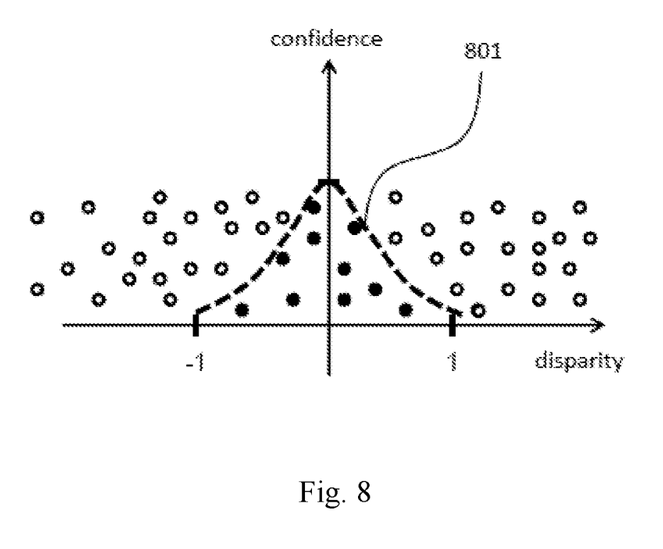
FIG. 8 shows a schematic diagram illustrating confidence value determination implemented in an image processing apparatus according to an embodiment.

FIG. 8 illustrates the approach to apply a post-processing filtering using the filter K of the estimated confidence maps based on their relative estimated disparity values. Only pixels within the bandwidth of the filter are processed using the Gaussian kernel defined by the filter K, i.e. the solid dots shown in FIG. 8 lying below the line 801. In an embodiment, the post-processing is performed only for the images along the directions different form the vertical and horizontal one.

Figure 9:
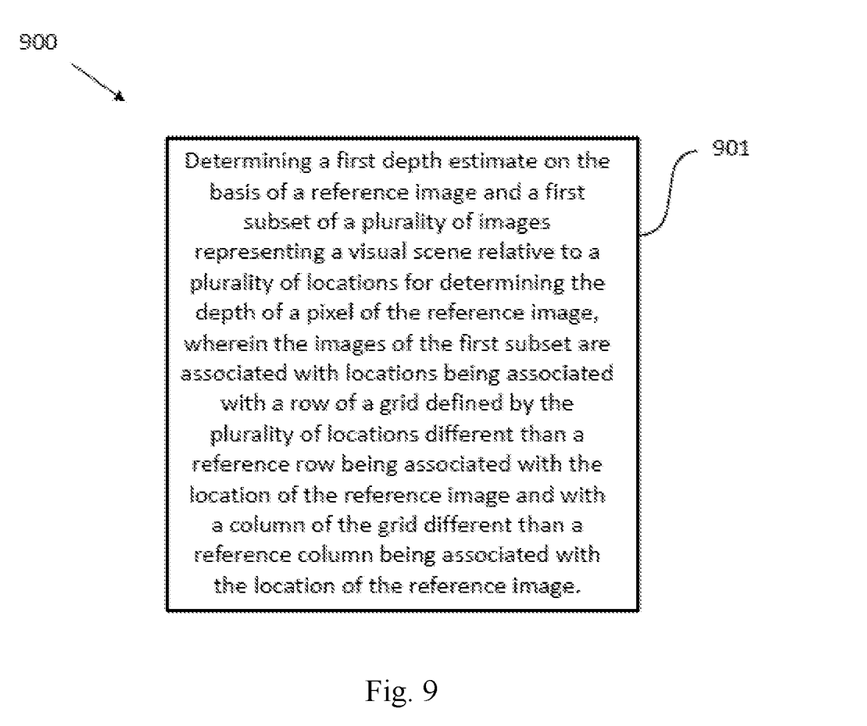
FIG. 9 shows a schematic diagram of an image processing method according to an embodiment.

FIG. 9 shows a schematic diagram of an image processing method 900 according to an embodiment. The image processing method 900 is configured to determine the depth 107 of a pixel of the reference image 201 of the plurality of images 105 representing a visual scene relative to a plurality of locations, wherein the plurality of locations define a two-dimensional grid 200 with rows and columns and wherein the location of the reference image 201 is associated with a reference row 203 and a reference column 205 of the grid 200. The image processing method 900 comprising the step of determining 901 a first depth estimate on the basis of the reference image 201 and a first subset of the plurality of images 105 for determining the depth 107 of the pixel of the reference image 201, wherein the images of the first subset are associated with locations being associated with at least one row of the grid different than the reference row 203 and with at least one column of the grid different than the reference column 205.

The image processing method 900 can be performed, for instance, by the image processing apparatus 100.

Embodiments of the disclosure may be implemented in a computer program for running on a computer system, at least including code portions for performing steps of a method according to the disclosure when run on a programmable apparatus, such as a computer system or enabling a programmable apparatus to perform functions of a device or system according to the disclosure.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM (Compact Disc, read-only memory), CD-R (Compact Disc, recordable), etc.) and digital video disk storage media; nonvolatile memory storage media including semiconductor-based memory units such as FLASH memory, electrically erasable programmable read-only memory (EEPROM), erasable programmable read-only memory (EPROM), (read-only memory) ROM; ferromagnetic digital memories; magnetoresistive random-access memory (MRAM); volatile storage media including registers, buffers or caches, main memory, random-access memory (RAM), etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Thus, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

Additionally, statements made herein characterizing the invention refer to an embodiment of the invention and not necessarily all embodiments.

What is claimed is:

1. An image processing apparatus, comprising a processor and a non-transitory computer-readable medium having processor-executable instructions stored thereon, wherein the processor-executable instructions, when executed, facilitate:

determining a depth of a pixel of a reference image of a plurality of images representing a visual scene relative to a plurality of locations, wherein each image of the plurality of images is associated with a respective location of the plurality of locations, wherein the plurality of locations define a two-dimensional grid with rows and columns, wherein the location of the reference image is associated with a reference row and a reference column of the grid, and wherein determining the depth of the pixel of the reference image comprises:
      determining a first depth estimate based on the reference image and a first subset of the plurality of images, wherein images of the first subset of the plurality of images include at least one image associated with a location in a row of the grid different than the reference row and at least one image associated with a location in a column of the grid different than the reference column;
   wherein determining the first depth estimate comprises:
      determining a modified horizontal plane by removing images of the first subset of the plurality of images that are not to be processed from a horizontal plane, wherein the pixel of the reference image and corresponding pixels in other images of the first subset of the plurality of images define a line along the horizontal plane;
      refocusing the modified horizontal plane to determine a refocused modified horizontal plane;
      determining an angle defined by an epipolar line in the refocused modified horizontal plane; and
      determining the first depth estimate based on the angle defined by the epipolar line;
   wherein the processor-executable instructions, when executed, further facilitate: determining a confidence value associated with the first depth estimate, wherein determining the confidence value for the first depth estimate excludes a depth estimate based on a filter K defined by the equation:

$$K(d) = \frac{e^{-d^2}}{\sqrt{2\pi}\, b},$$

where d denotes the disparity of the pixel and b denotes the baseline defined by the reference image and the first subset of the plurality of images.

2. The image processing apparatus of claim 1, wherein determining the depth of the pixel of the reference image further comprises:
   determining a second depth estimate based on the reference image and a second subset of the plurality of images, wherein images of the second subset of the plurality of images are associated with locations in the reference row; and combining the first depth estimate and the second depth estimate.

3. The image processing apparatus of claim 1, wherein determining the depth of the pixel of the reference image further comprises:

determining a second depth estimate based on the reference image and a second subset of the plurality of images, wherein images of the second subset of the plurality of images are associated with locations in the reference row;

determining a third depth estimate based on the reference image and a third subset of the plurality of images, wherein images of the third subset of the plurality of images are associated with locations in the reference column; and combining at least two of the first depth estimate, the second depth estimate or the third depth estimate.

4. The image processing apparatus of claim 3, wherein determining the depth of the pixel of the reference image further comprises:

computing a median value of a set of values comprising at least one of the first depth estimate, the second depth estimate or the third depth estimate.

5. The image processing apparatus of claim 1, wherein determining the depth of the pixel of the reference image further comprises:

determining a second depth estimate based on the reference image and a second subset of the plurality of images, wherein images of the second subset of the plurality of images are associated with locations being associated with the reference row; and determining a third depth estimate based on the reference image and a third subset of the plurality of images, wherein images of the third subset of the plurality of images are associated with locations being associated with the reference column.

6. The image processing apparatus of claim 1, wherein determining the depth of the pixel of the reference image further comprises:

determining a second depth estimate based on the reference image and a second subset of the plurality of images, wherein images of the second subset of the plurality of images are associated with locations being associated with the reference row; and determining a third depth estimate based on the reference image and a third subset of the plurality of images, wherein images of the third subset of the plurality of images are associated with locations being associated with the reference column;

wherein the processor-executable instructions, when executed, further facilitate: determining respective confidence values associated with the second depth estimate and the third depth estimate;

wherein determining the depth of the pixel of the reference image further comprises choosing as the depth of the pixel of the reference image the depth estimate having the largest confidence value from the group consisting of the first depth estimate, the second depth estimate and the third depth estimate.

7. The image processing apparatus of claim 5, wherein determining the confidence value for the first depth estimate, the second depth estimate or the third depth estimate is based on a structure tensor defined by the first subset, the second subset or the third subset of the plurality of images, respectively.

8. The image processing apparatus of claim 1, wherein determining the depth of the pixel of the reference image is based on the first depth estimate and further comprises interpolating the intensity of the pixel between the intensity of the pixel in the reference image and the intensities of the corresponding pixels in the first subset of the plurality of images.

9. The image processing apparatus of claim 1, wherein the image processing apparatus further comprises an image recorder configured to record the plurality of images representing the visual scene at the plurality of locations.

10. The image processing apparatus of claim 9, wherein the image recorder comprises a movable camera, an array of cameras or a plenoptic camera.

11. The image processing apparatus of claim 1, wherein the processor-executable instructions, when executed, further facilitate:

determining a depth map for the reference image by determining respective depths for a plurality of pixels of the reference image.

12. The image processing apparatus of claim 1, wherein the reference image and the first subset of the plurality of images have a common center pixel.

13. An image processing method, comprising:

determining, by an image processing apparatus, a depth of a pixel of a reference image of a plurality of images representing a visual scene relative to a plurality of locations, wherein each image of the plurality of images is associated with a respective location of the plurality of locations, wherein the plurality of locations define a two-dimensional grid with rows and columns, wherein the location of the reference image is associated with a reference row and a reference column of the grid, wherein determining the depth of the pixel of the reference image comprises: determining a first depth estimate based on the reference image and a first subset of the plurality of images, wherein images of the first subset of the plurality of images include at least one image associated with a location in at least one row of the grid different than the reference row and at least one image associated with a location in at least one column of the grid different than the reference column;

wherein determining the first depth estimate comprises:

determining a modified horizontal plane by removing images of the first subset of the plurality of images that are not to be processed from a horizontal plane, wherein the pixel of the reference image and corresponding pixels in other images of the first subset of the plurality of images define a line along the horizontal plane;

refocusing the modified horizontal plane to determine a refocused modified horizontal plane;

determining an angle defined by an epipolar line in the refocused modified horizontal plane; and determining the first depth estimate based on the angle defined by the epipolar line;

wherein the method further comprises: determining a confidence value associated with the first depth estimate, wherein determining the confidence value for the first depth estimate excludes a depth estimate based on a filter K defined by the equation:

$$K(d) = \frac{e^{-d^2}}{\sqrt{2\pi}\,b},$$

where d denotes the disparity of the pixel and b denotes the baseline defined by the reference image and the first subset of the plurality of images.

14. A non-transitory computer-readable medium having processor-executable instructions stored thereon for image processing, the processor-executable instructions, when executed, facilitating performance of the following:
   determining, by an image processing apparatus, a depth of a pixel of a reference image of a plurality of images representing a visual scene relative to a plurality of locations, the plurality of locations defining a two-dimensional grid with rows and columns, the location of the reference image being associated with a reference row and a reference column of the grid, wherein determining the depth of the pixel of the reference image comprises: determining a first depth estimate based on the reference image and a first subset of the plurality of images, wherein the images of the first subset are associated with locations being associated with at least one row of the grid different than the reference row and with at least one column of the grid different than the reference column;
   wherein determining the first depth estimate comprises:
      determining a modified horizontal plane by removing images of the first subset of the plurality of images that are not to be processed from a horizontal plane, wherein the pixel of the reference image and corresponding pixels in other images of the first subset of the plurality of images define a line along the horizontal plane;
      refocusing the modified horizontal plane to determine a refocused modified horizontal plane;
      determining an angle defined by an epipolar line in the refocused modified horizontal plane; and
      determining the first depth estimate based on the angle defined by the epipolar line;
   wherein the processor-executable instructions, when executed, further facilitate: determining a confidence value associated with the first depth estimate, wherein determining the confidence value for the first depth estimate excludes a depth estimate based on a filter K defined by the equation:

$$K(d) = \frac{e^{-d^2}}{\sqrt{2\pi}\,b},$$

where d denotes the disparity of the pixel and b denotes the baseline defined by the reference image and the first subset of the plurality of images.

15. The image processing apparatus of claim 1, wherein determining the depth of the pixel of the reference image further comprises:
   determining a second depth estimate based on the reference image and a second subset of the plurality of images, wherein images of the second subset of the plurality of images are associated with locations in the reference row;
   wherein determining the second depth estimate comprises:
      stacking the images of the second subset of the plurality of images into a 3D image cube, wherein the images of the second subset of the plurality of images are associated with locations disposed along a second line through the grid which crosses the reference image;
      extracting a horizontal plane of the 3D image cube by slicing the 3D image cube to provide an epipolar image having a second epipolar line forming an angle relative to a horizontal direction of the epipolar image; and
      determining the second depth estimate based on the second epipolar line.

16. The image processing method of claim 13, wherein determining the depth of the pixel of the reference image further comprises:
   determining a second depth estimate based on the reference image and a second subset of the plurality of images, wherein images of the second subset of the plurality of images are associated with locations in the reference row;
   wherein determining the second depth estimate comprises:
      stacking the images of the second subset of the plurality of images into a 3D image cube, wherein the images of the second subset of the plurality of images are associated with locations disposed along a second line through the grid which crosses the reference image;
      extracting a horizontal plane of the 3D image cube by slicing the 3D image cube to provide an epipolar image having a second epipolar line forming an angle relative to a horizontal direction of the epipolar image; and
      determining the second depth estimate based on the second epipolar line.

17. The non-transitory computer-readable medium of claim 14, wherein determining the depth of the pixel of the reference image further comprises:
   determining a second depth estimate based on the reference image and a second subset of the plurality of images, wherein images of the second subset of the plurality of images are associated with locations in the reference row;
   wherein determining the second depth estimate comprises:
      stacking the images of the second subset of the plurality of images into a 3D image cube, wherein the images of the second subset of the plurality of images are associated with locations disposed along a second line through the grid which crosses the reference image;
      extracting a horizontal plane of the 3D image cube by slicing the 3D image cube to provide an epipolar image having a second epipolar line forming an angle relative to a horizontal direction of the epipolar image; and
      determining the second depth estimate based on the second epipolar line.

* * * * *